United States Patent [19]
Izuno et al.

[11] Patent Number: 5,949,501
[45] Date of Patent: Sep. 7, 1999

[54] COORDINATES INPUT DEVICE USING LIQUID CRYSTAL SHEET

[75] Inventors: Akinobu Izuno, Isehara; Masahiko Ikeda, Hiratsuka; Morio Sato, Fujisawa, all of Japan

[73] Assignee: Kabushiki Kaisha Pilot, Tokyo to, Japan

[21] Appl. No.: 08/796,342

[22] Filed: Feb. 7, 1997

[30] Foreign Application Priority Data

Feb. 13, 1996 [JP] Japan .................................. 8-024983

[51] Int. Cl.$^6$ .................................................. G02F 1/133
[52] U.S. Cl. .................................................. 349/23
[58] Field of Search .............................. 345/173; 349/23

[56] References Cited

U.S. PATENT DOCUMENTS

| | | | |
|---|---|---|---|
| 5,111,316 | 5/1992 | Nobile et al. ......................... | 359/52 |
| 5,115,330 | 5/1992 | Nobile et al. ......................... | 359/52 |
| 5,117,297 | 5/1992 | Nobile et al. ......................... | 359/52 |
| 5,136,404 | 8/1992 | Nobile et al. ......................... | 359/52 |
| 5,357,266 | 10/1994 | Tagawa .................................. | 345/173 |
| 5,592,197 | 1/1997 | Tagawa .................................. | 345/173 |
| 5,610,629 | 3/1997 | Buar ..................................... | 345/173 |

FOREIGN PATENT DOCUMENTS 5-224182  9/1993  Japan .
5-281530  10/1993  Japan .

*Primary Examiner*—William L. Sikes
*Assistant Examiner*—James Dudek
*Attorney, Agent, or Firm*—Darby & Darby

[57] ABSTRACT

A coordinates input device includes: a liquid crystal sheet comprising a conductive layer, a transparent high electric resistant layer, a liquid crystal-dispersed polymer layer, and a transparent insulating layer, all of which are sequentially laminated on a board; and a tablet comprising a Y-axis coordinate resistant sheet, a pressure sensitive sheet, an electrode sheet, a pressure sensitive sheet, an X-axis coordinates resistant sheet, and a flexible film for protection, all of which are sequentially laminated on a base. The Y-axis coordinates resistant sheet and the X-axis coordinates resistant sheet are connected to a detecting circuit for detecting coordinates indicated by a coordinates indicator.

8 Claims, 8 Drawing Sheets

COORDINATES INPUT DEVICE USING LIQUID CRYSTAL SHEET

BACKGROUND OF THE INVENTION

(1) Field of the Invention

The present invention relates to a coordinates input device using a liquid crystal sheet, more particularly, to a coordinates input device using a liquid crystal sheet in which, when a surface of the liquid crystal sheet is traced with a coordinates indicator or the like, the corresponding characters or figures appear as a liquid crystal display, and the coordinates of a handwriting drawn on the liquid crystal sheet are detected.

(2) Description of the Prior Art

Conventionally, there have been proposed various coordinates reading devices (also called a tablet) for use in inputting the coordinates of drawings or figures. Namely, when pointing devices such as a stylus pen and the like move on a surface of a tablet, its position is converted into coordinates position on a display screen (for example, a video monitor screen). As for coordinates reading devices, there are, for example, an electromagnetic induction type, a pressure sensitive resistant type, a pressure sensitive contacting type, an electrostatic capacitance coupling type and a magnetic coupling type.

As for tablets capable of displaying handwritings, tablets with active liquid display have been often seen recently. Here, the tablet with active liquid display is for displaying characters, figures and the like in the form of liquid crystal display by optically changing displayed dots corresponding to the detected input coordinates.

With the conventional former tablet described above, however, the pointing devices such as the stylus pen and the like are made to move on the surface of the tablet to input figures, characters or the like, so that inputted figures, characters or the like are displayed on the monitor screen, but the handwritings are not kept on the tablet. Thus, inconveniently, characters, figures or the like must be inputted by watching the monitor screen and moving the pointing device while replying on one's sense.

Moreover, when it is desired to add additional writings or decorations to characters, figures or the like which have been already inputted, the operator has to confirm the starting position of the drawing by reviewing the monitor screen since the tablet does not keep the handwritings of initially inputted characters, figures or the like. Naturally, the same problem exists for erasing a part of the image. Such writing and erasing operations have been considered too difficult.

The conventional latter tablet with active liquid crystal display, as compared with an externally charged liquid crystal sheet for liquid crystal displaying characters, figures or the like by externally applying an electrical charge, has the following problems.

a) The tablet with active liquid crystal display requires many operational processes due to application of feedback, and a responding speed to the coordinates input is slow when the same operational processing ability is provided.

b) The tablet with active liquid crystal display requires an active element to drive the liquid crystal, which makes the structure of the liquid crystal display device itself complicated.

c) The tablet with active liquid crystal display tends to be made thicker, and lacks flexibility.

d) The tablet with active liquid crystal display employs a dot-display system, which lacks smoothness of characters.

e) The tablet with active liquid crystal display is difficult to exchange the liquid crystal section.

f) The tablet with active liquid crystal display does not keep displays when the power source is turned OFF.

g) The tablet with active liquid crystal display is difficult to make its display section a wider screen.

SUMMARY OF THE INVENTION

The present invention is made to solve the conventional problems as described above, and it is therefore an object of the invention to provide a coordinates input device using a liquid crystal sheet in which characters, figures or the like are displayed as a liquid crystal display or erased by applying or removing an electric charge, and its coordinates indicated by a coordinates indicator are detected.

According to an aspect of the present invention, there is provided a coordinates input device using a liquid crystal sheet which comprises: a liquid crystal sheet comprising a conductive layer, and a liquid crystal-dispersed polymer layer in which liquid crystal is finely dispersed in polymer matrix; and a coordinates reading-device for detecting coordinates indicated by a coordinates indicator having a function of applying an electric charge on the liquid crystal sheet or removing the electric charge therefrom.

Further advantages and features of the invention as well as the scope, nature and utilization of the invention will become apparent to those skilled in the art from the description of the preferred embodiments of the invention set forth below.

DESCRIPTION OF THE PREFERRED EMBODIMENT

Figure 1:
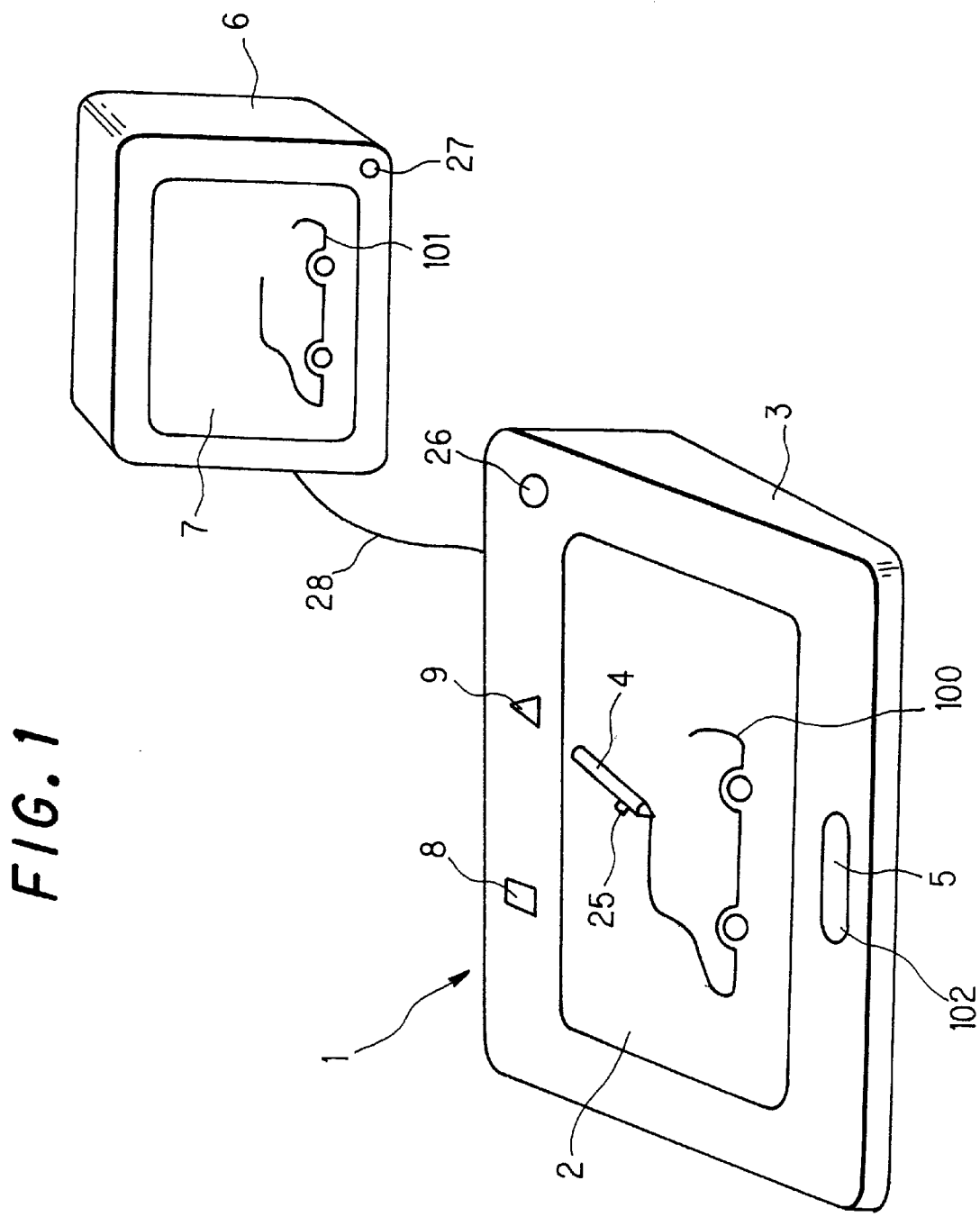
FIG. 1 is a schematic perspective view of a coordinates input device using a liquid crystal sheet according to a first embodiment of the present invention.

A liquid crystal sheet used in this invention is preferably made by sequentially laminating a conductive layer, a transparent high electric resistant layer of which volume resistivity is equal to or more than $10^{13} \Omega \cdot cm$ in 20° C. air at a relative humidity of 90%, a liquid crystal-dispersed polymer layer in which liquid crystal is finely dispersed in a polymer matrix and the volume resistivity is equal to or more than $10^{13} \Omega \cdot cm$ in 20° C. air at a relative humidity of 90%, and a transparent insulating layer of which volume resistivity is equal to or more than $10^{13} \Omega \cdot cm$ in 20° C. air at a relative humidity of 90%.

The conductive layer of the liquid crystal sheet may be either transparent or opaque, and any layer having a surface resistivity equal to or less than $10^7 \Omega/\square$ can be used. Actually, the layer is made by giving conductivity to a base surface with aluminum, titanium, chromium, tin, rhodium, gold, stainless steel, titanium nitride, nickel-chromium, aluminum-chromium, or indium tin oxide. The base described above is a carrier of the conductive layer, to be more specific, it may be paper, cloth, non-woven cloth, or plastic films of polyethylene terephthalate, polyethylene naphtalate, polypropylene, polyethylene, polyvinyl chloride, polysulfone, polyphenyleneoxide, ionomer, polyimide, polycarbonate and the like. However, the base is not particularly required in a case where the conductive layer itself is a metallic film.

The liquid crystal-dispersed polymer layer of the liquid crystal sheet is made by dispersing liquid crystal in polymer matrix. As a method for dispersing the liquid crystal in polymer matrix, there are a polymer liquid crystal common solvent evaporation phase separating method (common solvent casting method), a polymerization phase separating method of which the polymeric precursor are polymerized from liquid crystal polymeric precursor mixture by light or heat, a melt and cool phase separating method of which liquid crystal and polymer in molten condition are cooled, and a method of dispersing the liquid crystal in polymer matrix after dispersing emulsion in water-base resin, applying and drying. These methods can be employed as necessary.

As polymers used for the liquid crystal-dispersed polymer layer, any polymers that have difficulty in compatible with the liquid crystal can be used. Specifically such polymers are, vinyl resins such as polyethylene chloride, polypropylene, polystyrene and acrylic resin, vinylidene chloride resin, polyvinyl acetal resin, cellulosic resin, ionomer, polyamide, polycarbonate, polyphenyleneoxide, polysulfone, fluorocarbon resin, silicone resin, styrene-butadiene rubber, chlorosulfonated polyethylene, polyester, epoxy resin, etc.

In addition, as polymers constituting the liquid crystal-dispersed polymer layer, polymers having a cross-linked structure (hereinafter called 'cross-linked polymer') are preferred. When cross-linked polymers are used, the liquid crystal is not compatible with the cross-linked polymers even when the liquid crystal sheet of the invention is placed in the state of a high temperature, and the stable liquid crystal finely dispersed structure can be maintained. Therefore, the liquid crystal sheet having durability without degenerated performance against the change of characteristics over time can be obtained.

As for the cross-linked polymer, there are cross-linked polymer formed by reaction as a result of mixing cross-linking agent which reacts with functional groups with polymers having a functional group such as double bond, hydroxyl, carboxyl, epoxy, isocyanate and amino, and cross-linked polymer formed by reaction as a result of mixing a reactive polymer with one of above described polymers having a functional group.

As for cross-linking agents used in the above described reaction, there are isocyanate compound, organic peroxide, amine compound, aziridine compound, epoxy compound, dicarboxylic acid or carbonic anhydride, formaldehyde, dialdehyde, diol, bisphenol, silanol compound, metallic oxide, metallic halide, photo-crosslinkage agent (photopolymerizaton initiator) and the like. As for reactive polymers used in the above reaction, there are phenol resin, amino resin, polyisocyanate, polyol, epoxy resin and the like.

As for preferred cross-linked polymers, there are cross-linked polymers formed by reacting di- or polyisocyanate with polymers such as polyvinylacetal resin, epoxy resin, acrylic resin having functional group such as hydroxyl or carboxyl, polyester resin and the like. As for more preferable cross-linked polymer, there are the cross-linked polymer made by reacting di- or polyisocyanate with polyvinyl acetal resin, wherein polyacetal resins are polyvinyl formal, polyvinyl acetal, polyvinyl butyral and the like.

The liquid crystal used for the liquid crystal-dispersed polymer layer is preferably a nematic liquid crystal of which dielectric anisotropy is positive. As for the liquid crystal phase, such liquid crystals having the temperature range of −10° C. to 100° C. in practical use and birefringence Δn equal to or more than 0.2 for indicating sharp recorded images are preferable.

The volume resistivity of the liquid crystal-dispersed polymer layer of the liquid crystal sheet is preferably equal to or more than $10^{13} \Omega \cdot cm$ at the atmospheric temperature of 20° C. and the relative humidity of 90% (hereinafter shortened as 90% RH). This provides a sharp contour of recorded images, and improves abilities of memory, erasability and durability even under the condition of the atmospheric temperature of 20° C. and 90% RH. Since the applied electrostatic charges have less capability of transfer and attenuation, and they can be held for longer time, consequently the contour of recorded images remain sharp and no-blurring occurs even after a lapse of time. Further, since the applied electrostatic charges become difficult to transfer and attenuate vertically of the sheet screen, the erasability is also improved. But when the volume resistivity of the layer is less than $10^{13} \Omega \cdot cm$, the applied electrostatic charges can be easily transferred and attenuated on the flat plane and the up and down of the sheet screen so that the electrostatic charges may be lost or attenuated with time, and the electrostatic charges become unbalance on the flat plane and the upper and lower portion of the sheet screen. As a result, the memory of recorded images becomes short.

The insulating layer of the liquid crystal sheet is composed of a transparent high electrical resistant polymer. Preferably, the volume resistivity of the polymer is at least equal to or more than $10^{13} \Omega \cdot cm$ at atmospheric temperature of 20° C. and 90% RH. For example, there are polyethylene terephtalate, polyethylene naphtalate, polypropylene, polyethylene, polyvinyl chloride, polysulfone, polyphenyleneoxide, ionomer, polycarbonate, nylon, fluorocarbon resin, and mixture of these resins. The insulating layer is obtainable by laminating films of above materials with a pressure sensitive adhesive or an adhesive, applying and drying the solution of the material having the above-described properties, or applying and reacting the solution of reactive materials. The insulating layer of which the volume resistivity is less than $10^{13} \Omega \cdot cm$ at the atmospheric temperature of 20° C. and 90% RH makes memory short for the same reason as the liquid crystal-dispersed polymer layer described above.

The transparent high electrical resistant layer is placed between the conductive layer and the liquid crystal-dispersed polymer layer, and the volume resistivity equal to or more than $10^{13} \Omega \cdot cm$ at the atmospheric temperature of 20° C. and 90% RH is preferable. This layer ensures the prevention of transfer and attenuation of the applied electrostatic charge, which results in improved performance of producing sharpness of contour of recorded images, memory, erasability and the like. The layer of which the volume resistivity is less than $10^{13} \Omega \cdot cm$ at the atmospheric temperature of 20° C. and 90% RH makes memory short for the same reason as the above-described liquid crystal-dispersed polymer layer.

As for polymers used for the transparent high electric resistant layer, there are chlorinated polyethylene, polypropylene, polystyrene, vinyl resin such as acrylic resin, vinylidene chloride resin, polyvinyl acetal resin, cellulosic resin, ionomer, polyamide, polycarbonate, polyolefin oxide, polyethylene, polyphenyleneoxide, polysulfone, fluorocarbon resin, silicone resin, butadiene rubber, styrene rubber, chlorosulfonated polyethylene, polyester, epoxy resin, etc., and wherein polyvinyl acetal resin includes e.g. polyvinyl formal, polyvinyl acetal, polyvinyl butyral, etc.

The following cross-linked polymers can also be used for the transparent high electric resistant layer; cross-linked polymer prepared by reaction as a result of mixing crosslinking agent which reacts with functional groups with polymers having a functional group such as double bond, hydroxyl, carboxyl, epoxy, isocyanate, and amino; and cross-linked polymer formed by reaction as a result of mixing reactive polymer with polymers having the above-described functional group.

As for the cross-linking agent used in the reaction above, there are isocyanate compound, organic peroxide, amine compound, aziridine compound, epoxy compound, dicarboxylic acid or carbonic anhydride, formaldehyde, dialdehyde, diol, bisphenol, silanol compound, metallic oxide, metallic halide, photo crosslinkage agent (photopolymerizaton initiator), etc. As the reactive polymer used in the reaction above, there are phenol resin, amino resin, polyisocyanate, polyol, epoxy resin, and the like.

As for preferred cross-linked polymer, there are cross-linked polymer formed by reacting di- or polyisocyanate with polymers such as polyvinyl acetal resin, epoxy resin, acrylic resin having a functional group such as hydroxyl and carboxyl, polyester resin, etc. As more preferable cross-linked polymer, there is cross-linked polymer made by reacting di- or polyisocyanate with polyvinyl acetal resin, wherein polyvinyl acetal resins include polyvinyl formal, polyvinyl acetal, polyvinyl butyral and the like.

The transparent high electrical resistant layer can be obtainable by applying the solution of layer material, or applying and reacting the solution of reactive materials, or can be also obtainable by laminating high electric resistant films with a pressure sensitive adhesive or adhesive. The preferred thickness of transparent high electric resistant layer is in the range of from 0.4 to 10 $\mu$m. As examples of reactive materials, cross-linking agent is di-or polyisocyanate compound, and reactive compounds which react with relevant cross-linking agents are polyvinylalkylal, epoxy resin, carboxylic acrylic resin, polyester resin and the like.

The transparent high electric resistant layer can be made by laminating high electrical resistant films with the pressure sensitive adhesive or the adhesive. As the high electrical resistant film, there are films of polyethylene terephtalate, polyethylene naphtalate, polypropylene, polyethylene, polyvinyl chloride, polysulfone, polyphenyleneoxide, ionomer, polycarbonate, nylon and fluorocarbon resin, silicon dioxide film and the like.

As the coordinates reading device used for the coordinates input device of the invention, if it is the one which detects the indicated coordinates by the coordinates indicator which has a function to apply or remove the electrical charge on and from the liquid crystal sheet, it is not limited in particular. For example, there are an electromagnetic induction type, a pressure sensitive resistant type, a pressure sensitive contact type, a capacitance coupling type, a magnetic coupling type, and the like.

The decryption will be made with regards to the coordinates input device using the liquid crystal sheet by referring to the accompanying drawings.

Figure 2:
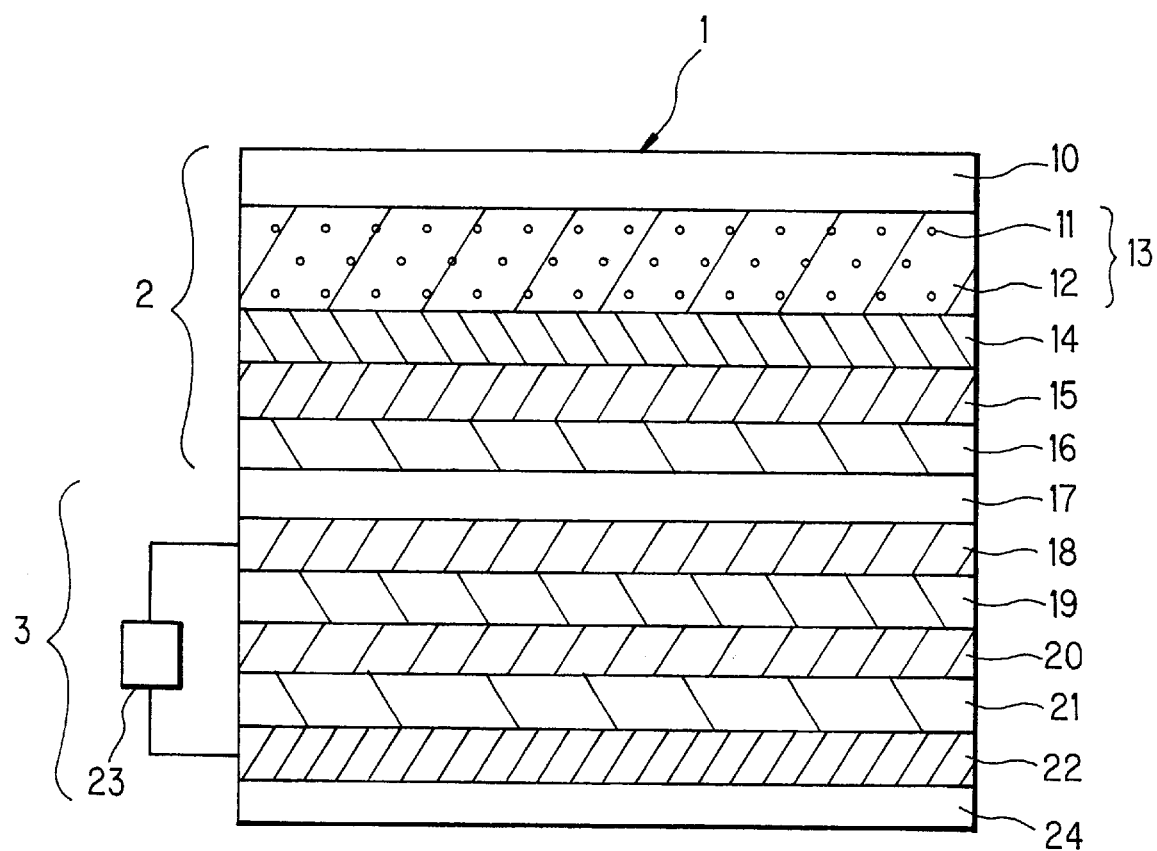
FIG. 2 is a vertical sectional view schematically showing the coordinates input device of FIG. 1.

FIG. 1 shows a schematic perspective view of the coordinates input device using the crystal liquid sheet according to an embodiment of this invention. FIG. 2 shows a schematic vertical sectional view of the coordinates input device of FIG. 1. A liquid crystal sheet 2 shown in FIGS. 1 and 2 is made by the following procedure.

Namely, as a conductive layer 15, there is used an evaporated aluminum layer of #125 * Metallumy TS (manufactured by Toyo Metallizing Co., Ltd.: an aluminum evaporated film in which a base 16 is polyethylene terephthalate film). Thereafter, a transparent high electric resistant layer 14 is formed on the conductive layer by applying a solution including the following compositions on the conductive layer 15, drying and curing it so that the dried film thickness becomes 3 $\mu$m.

Denka formal #20 (manufactured by Denki Kagaku Kogyo Kabushiki Kaisha:Polyvinyl formal)10% Tetrahydrofuran solution 9.0 g

*Takenate D 110N (manufactured by Takeda Chemical Industries, Ltd.:Polyisocyanate) 0.4 g Furthermore, a liquid crystal-dispersed polymer layer 13 in which liquid crystal droplets 11 are finely dispersed in a polymer matrix 12 is formed by applying a solution including the following compositions on the above transparent high electric resistant layer 14, drying and curing it so that the dried film thickness becomes 7 $\mu$m.

*Vinylec K-624 (manufactured by Chisso Corporation: Polyvinyl formal) 10% Tetrahydrofuran solution 4.2 g

*Takenate D 110N(manufactured by Takeda Chemical Industries, Ltd.:Polyisocyanate) 0.56 g E44 (manufactured by MERCK Corporation: Nematic liquid crystal) 0.36 g A transparent insulating layer 10 composed of Tetron film F(manufactured by Teijin Limited: Polyethylene terephthalate film) of 9 $\mu$m on the above liquid crystal-dispersed polymer layer 13 is block-layered by the pressure sensitive adhesive. Further, the conductive layer 15 is electrically connected with the conductive material(hereafter called 'a contact electrode 102) adhered on an operation start button 5 shown in FIG. 1.

In addition, regarding the above liquid crystal-dispersed polymer layer 13 and the transparent high electric resistant layer 14 which have been conditioned to have humidity at 90% RH at the temperature 20° C., as a result of which the volume resistivity is measured by a DC power source (manufactured by TRIO KABUSHIKI KAISHA: PR-630), an electrometer (manufactured by TAKEDA RIKEN KOUGYO KABUSHIKI KAISHA: TR 8651) and the insulation resistant measurement sample box (manufactured by Advantest Corporation: TR 42), and as a result, the following values are shown.

Transparent high electric resistant layer
$1.5 \times 10^{14} \Omega \cdot cm$

Liquid crystal-dispersed polymer layer
$7.4 \times 10^{14} \Omega \cdot cm$

On the other hand, the liquid crystal sheet 2 manufactured by the above described manner is adhered by adhesive to a coordinates reading device 3 (herein after called 'a tablet') structured as shown in FIG. 2. The tablet 3 of this embodiment is a pressure sensitive resistant type, and is made up of a Y-axis coordinates resistant sheet 22, a pressure sensitive sheet 21, an electrode sheet 20, a pressure sensitive sheet 19, an X-axis coordinates resistant sheet 18, and a flexible sheet 17 composed of an insulator for protection, and they are sequentially laminated on a base 24 of an insulating material. Further, the Y-axis coordinates resistant sheet 22 and the X-axis coordinates resistant sheet 18 are connected to a detecting circuit 23 for detecting coordinates indicated by a coordinates indicator 4 (herein after called 'a pen').

Figure 3:
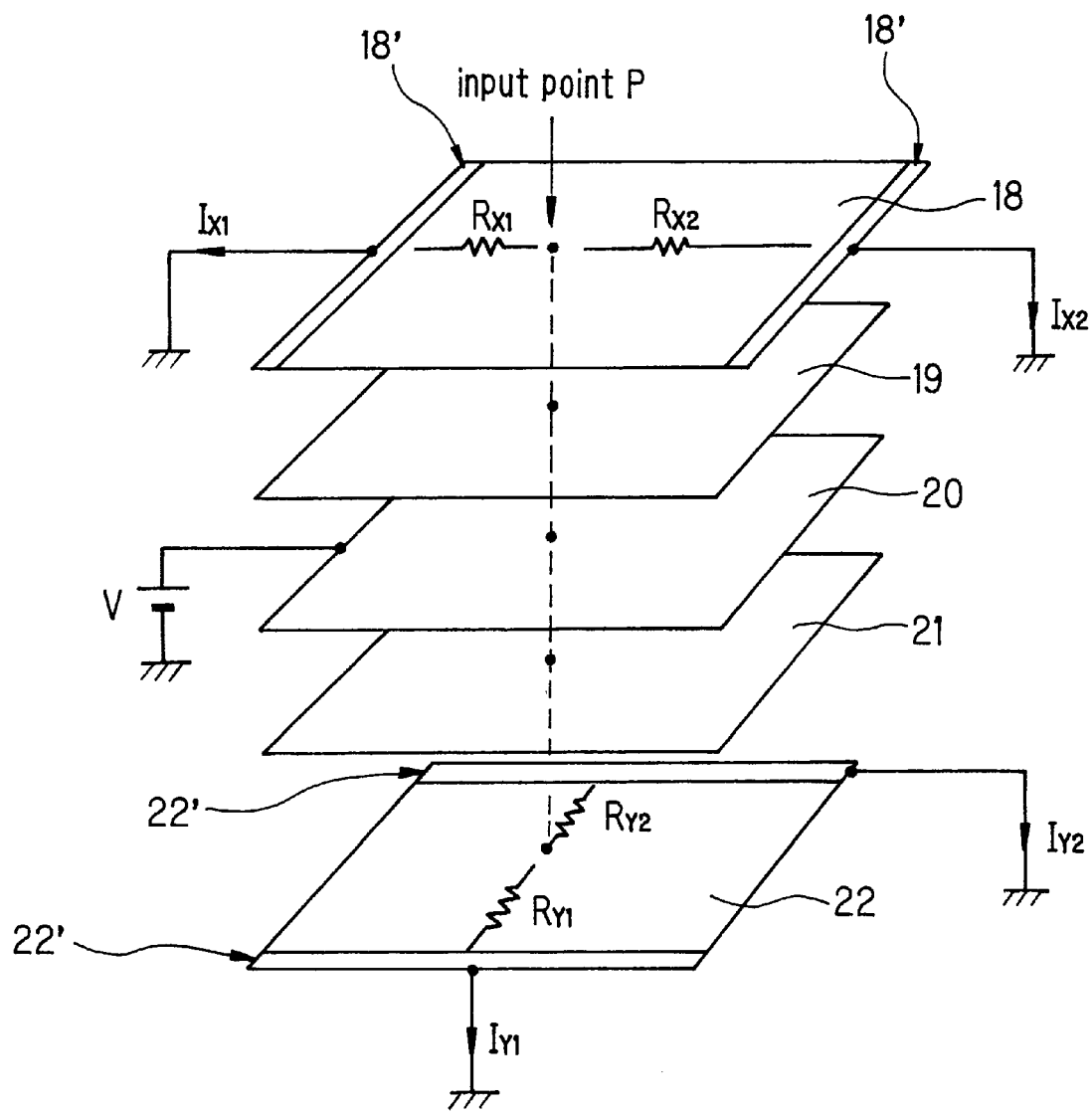
FIG. 3 is a view showing a principle of the coordinates detecting portion of FIG. 2.

FIG. 3 shows a principle of the coordinates detected portion of FIG. 2. A voltage V is applied to the electrode sheet 20, the both side surfaces thereof are held between the pressure sensitive sheet 19 and the pressure sensitive sheet 21, which retain a high resistant value when there is no pressure, and when the pressure over predetermined value is applied, the resistant value is changed toward an extremely low resistant value in a direction of thickness. In addition, the surfaces of each pressure sensitive sheet 19, 21 which is not on the side of the electrode sheet 20 is connected to the X-axis coordinates resistant sheet 18 and the Y-axis coordinates resistant sheet 22, and both ends thereof are provided with current application electrodes 18' and 22', which in turn, are connected to the detecting circuit 23, respectively, and can measure each current.

When the writing pressure which is above the predetermined pressure is applied on a selected point on the liquid crystal sheet 2 with the pen 4, the pressure is transmitted to the pressure sensitive sheets 19 and 21, respectively, thereby each point P of the pressure sensitive sheets 19 and 21 is changed toward the extremely low resistant value in the direction of thickness. As a result, the voltage V is transmitted to each of the points P of the X-axis coordinates resistant sheet 18 and the Y-axis coordinates resistant sheets 22 through the respective pressure sensitive sheets 19 and 21, respectively. Here, viewing only the X-axis coordinates resistant sheet 18, the current $I_{x1}$ and the current $I_{x2}$ flowing from the point P through the both terminals of the current application electrode 18' are proportional to a reciprocal of the resistant $R_{x1}$ and $R_{x2}$ flowing from the point P through the current application electrode 18'. The ratio of resistant $R_{x1}$ and resistant $R_{x2}$ is proportional to the ratio of x axis direction in the point P. Namely, coordinates point P in the x-axis direction is obtained by determining the ratio of the current $I_{x1}$ and $I_{x2}$. At the same time, the coordinates point P in the Y-axis direction is obtained by determining the ratio of the current $I_{y1}$ and $I_{y2}$ of Y-axis.

Figure 4:
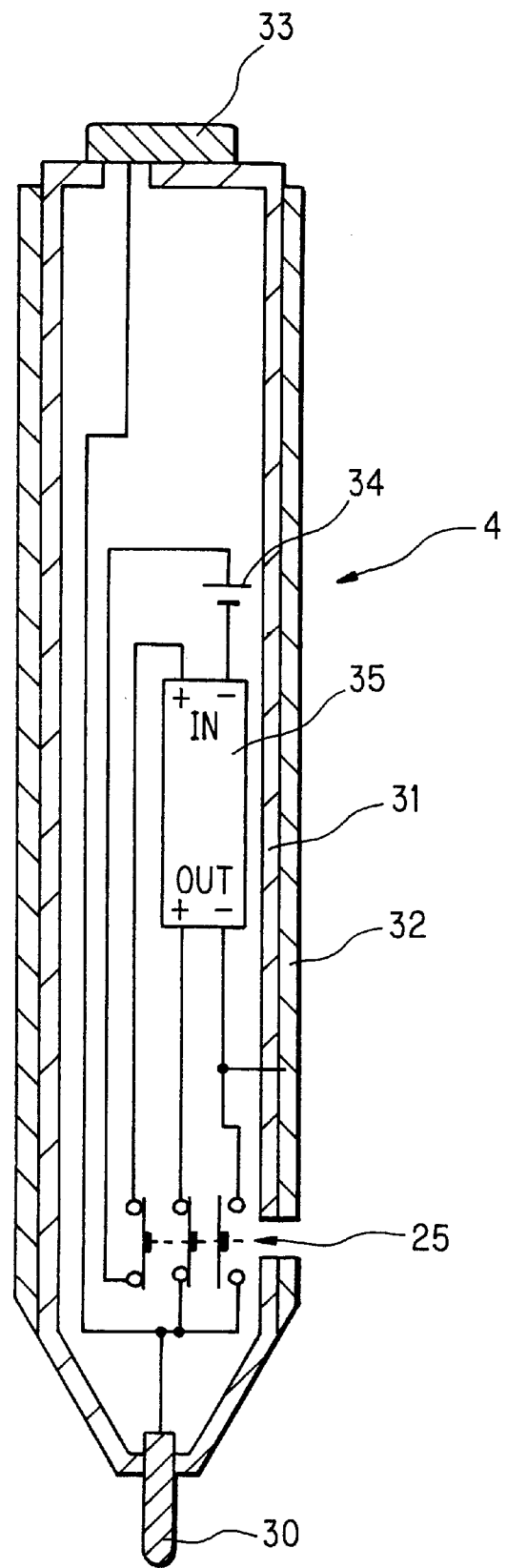
FIG. 4 is a vertical sectional view schematically showing an inner arrangement of a pen used in the first embodiment.

The description will be made with regards to the pen 4 shown in FIG. 1. FIG. 4 is a vertical sectional view schematically showing an inner arrangement of the pen 4 used for the coordinates input device 1 of this embodiment. As shown in FIG. 4, the pen 4 includes therein a write/erase-changing switch 25, a power source 34, and a voltage generating unit 35 for applying electric charge to the liquid crystal sheet 2. The both ends of the pen 4 are provided with a fine line writing section 30 and a bold line writing section 33 comprising conductive material capable of transmitting the writing pressure to the pressure sensitive sheets 19 and 21 on the tablet 3 and applying or removing electric charge on or from the liquid crystal sheet 2. By this structure, it is possible to correspond to the functions (a fine line write/erase, a bold line write/erase) provided for the coordinates input device 1. As shown in the drawing, the fine line writing section 30 and the bold line writing section 33 are electrically connected to the voltage generating unit 35 through the write/erase-changing switch 25. Further, a shaft barrel 31 of the pen 4 is made of insulating material, and an outer barrel 32 made of conductive material is provided around the periphery of the shaft barrel 31. The outer barrel 32 is electrically connected to the minus output side of the voltage generating unit 35.

Description will now be made as regards a writing operation by using the coordinates input device 1 according to the present invention, which comprises the liquid crystal sheet 2 and the tablet 3. After confirming that a video output of the coordinates input device 1 is connected to a display device 6 (a television having a video input) through a cord 28, a power source switch 26 of the coordinates input device 1 is turned ON and a power source switch 27 of the display device 6 connected to the coordinates input device 1 through the cord 28 is also turned ON.

Thereafter, the pen 4 is held with one hand and a power source 34 of the pen 4 is turned ON by pushing the write/erase-changing switch 25. The aforesaid FIG. 4 shows the state when the power source 34 in turned ON. By this operation, the power source 34 is turned ON, and also the writing sections 30 and 33 are electrically connected to one end of the writing output terminals of the voltage generating unit 35. In the case that the write/erase-changing switch 25 is not pushed, the power source of the pen 4 is in the OFF state. As a result, the writing sections 30 and 33 are electrically connected to the outer barrel 32.

Next, a writing button 8 is pushed in order to select a writing function of the coordinates input device 1, and while pushing the write/erase-changing switch 25 of the pen 4, an operation start button 5 of the coordinates input device 1 is pushed with a finger of the other hand. Consequently, a contact electrode 102 which covers the operation start button 5 is touched by part of the human body, and then the contact electrode 102 of the operation start button 5 is electrically connected to the outer barrel 32 of the pen 4. As described above, since the conductive layer 15 of the liquid crystal sheet 2 is connected to the contact electrode 102 of the operation start button 5, the conductive layer 15 is electrically connected to the outer barrel 32 of the pen 4. Concurrently with this, the writing charge voltage is outputted from the voltage generating unit 35 to the writing sections 30 and 33.

When the fine line writing section 30 or the bold line writing section 33 of the pen 4 is pressed against the liquid crystal sheet 2 and moved thereupon as the operation start button 5 is pushed with the finger of the other hand, the electric charge is applied on a written part of the liquid crystal sheet 2, and the liquid crystal droplets 11 of the liquid crystal-dispersed polymer layer 13 are oriented by an electrostatic field. As a result, handwriting appears as liquid crystal representation on the liquid crystal sheet 2, so that a drawing pattern 100 is obtained. At the same time, coordinates of a position indicated by the pen 4 are detected by the pressure sensitive resistant type tablet 3, and the detected position is converted to coordinates position of a monitor screen 7 of the display device 6. A drawing pattern 101 which is identical with the drawing pattern 100 displayed on the liquid crystal sheet 2 is displayed on the monitor screen 7. Since the drawing pattern 100 identical with the drawing pattern 101 displayed on the monitor screen 7 remains on the liquid crystal sheet 2, it is possible to carry out drawing easier than drawing by relying on one's sense while watching the monitor screen 7 to confirm the handwriting.

When partially erasing the drawing patterns 100 and 101 obtained in the above described manner, an erasing button 9 is pushed in order to select the erase function of the coordinates input device 1. After pushing the erasing button 9, the operation start button 5 is pushed without pushing the write/erase-changing switch 25 of the pen 4. At this time the power source 34 of the pen 4 is turned OFF. Consequently, the contact electrode 102 of the operation start button 5 comes into contact with the part of the human body and is electrically connected to the outer barrel 32 of the pen 4 through the human body. Accordingly, at this time, the writing sections 30 and 33 of the pen 4 have the potential equal to that of the conductive layer 15 of the liquid crystal sheet 2. In this state, the drawing pattern 100 is traced with the writing section 30 or 33 of the pen 4 as the operation start button 5 is being pushed. Since the conductive layer and the writing section 30 or 33 of the pen 4 have the electrically equal potential, the electrostatic field which is applied between the surface of the liquid crystal sheet 2 and the conductive layer 15 is neutralized and removed, and then the liquid crystal droplets 11 in the liquid crystal-dispersed polymer layer 13 are no longer oriented. Consequently, only the traced part of the drawing pattern 100 is easily erased. At the same time, since the coordinates input device 1 is in the erasing mode, both the drawing pattern 100 displayed on the liquid crystal sheet 2 and the drawing pattern 101 on the monitor screen 7 are erased. Accordingly, this allows much easier erasing as compared with erasing of the drawing pattern 101 by relying on one's sense while watching the monitor screen 7 to confirm the erasing position thereon.

Further, the conductive writing sections 30 and 33 of the pen 4 may be made of an elastic body which deforms by external force. This allows the contact area between the writing sections 30, 33 and the liquid crystal sheet 2 to change corresponding to the change of the writing pressure. That is, when the writing pressure is low, the contact area becomes small, and when the writing pressure is high, the contact area becomes wider, accordingly. The coordinates input device 1 of this embodiment can detect not only coordinates but also area information. Consequently, it is possible to match the drawing width or the erasing width on the monitor screen 7 which changes by changes of the writing pressure with the drawing width or the erasing width on the liquid crystal sheet 2.

With coordinates reading devices such as the pressure sensitive resistant type, the pressure sensitive contact type, and the electrostatic capacitance coupling type, a special coordinates indicator is not basically required, and the presence of pressure or capacitive coupling on the coordinates point is sufficient to indicate the selected coordinates on the surface of the tablet. Accordingly, the coordinates can be indicated by giving the pressure or the capacitive coupling to the selected coordinates point of the coordinates reading device using part of human body such as fingers.

Further, the coordinates indicator of a conductive material makes it possible to apply the electric charge on the selected part of the liquid crystal sheet, or to remove the electric charge therefrom in order to keep the handwriting of writing or drawing thereon. For example, the human body is also conductive, thus writing or erasing can be made by using the part of human body such as fingers.

The description will now be made with regard to a case where the power source for applying electric charge on the liquid crystal sheet, and the voltage generating unit electrically connected to the power source are included in the main body of the coordinates input device. One end of output terminals of the voltage generating unit is electrically connected to the erasing electrode provided on the conductive layer of the liquid crystal sheet and the coordinates input device, whereas the other end of the output terminals of the voltage generating unit is electrically connected to the writing electrode provided on the coordinates input device.

Description will now be made with regard to the operation of the coordinates input device structured by the above described manner. After confirming that the video output of the coordinates input device is connected to the display device (the television having the video input) through the cord, the power source switch of the coordinates input device and the power source switch for applying electric charge on the liquid crystal sheet are turned ON, and the power switch of the display device connected to the coordinates input device through the cord is also turned ON.

Thereafter, the writing button is pushed in order to select the writing function of the coordinates input device. This writing button serves also as the operation start switch. Then, a finger of one hand is in touch with the writing electrode while a finger of the other hand is pressed against the liquid crystal sheet and moved thereupon, the electric charge is applied on a written part of the liquid crystal sheet from the writing electrode through a human body, and liquid crystal droplets of the liquid crystal-dispersed polymer layer are oriented by the electrostatic field. As a result, a handwriting appears as liquid crystal representation on the liquid crystal sheet, so that a drawing pattern is obtained.

At the same time, coordinates of a position indicated by the finger are detected by the coordinates reading device. A drawing pattern which is identical with the drawing pattern displayed on the liquid crystal sheet is displayed on the monitor screen. Since the drawing pattern identical with the drawing pattern displayed on the monitor screen remains on the liquid crystal sheet, it is possible to carry out drawing easier than drawing by relying on one's sense while watching the monitor screen to confirm the handwriting.

When partially erasing the drawing patterns obtained in the above described manner, the erasing button is pushed in order to select the erase function of the coordinates input device. This erasing button serves also as the operation start button. After pushing the erasing button, a finger of one hand is pressed and traced on the drawing pattern on the liquid crystal sheet as a finger of the other hand is in touch with the erasing electrode, the electric charge of the traced part on the liquid crystal sheet is removed through the human body. That is, the electrostatic field which is applied between the surface of the liquid crystal sheet and the conductive layer is neutralized and removed, and then the liquid crystal droplets in the liquid crystal-dispersed polymer layer are no longer oriented. Consequently, only the traced part of the drawing pattern is easily erased.

At the same time, since the coordinates input device is in the erasing mode, both the drawing pattern displayed on the liquid crystal sheet and the drawing pattern on the monitor screen are erased. Accordingly, this allows much easier erasing as compared with erasing of the drawing pattern by relying on one's sense while watching the monitor screen to confirm the erasing position thereon. The power source and the voltage generating unit for applying the electric charge on the liquid crystal sheet are provided as an independent power source box in a casing. In addition, the writing electrode and erasing electrode, which are electrically connected to the output terminals of the voltage generating unit, may also be provided in the power source box.

Figure 5:
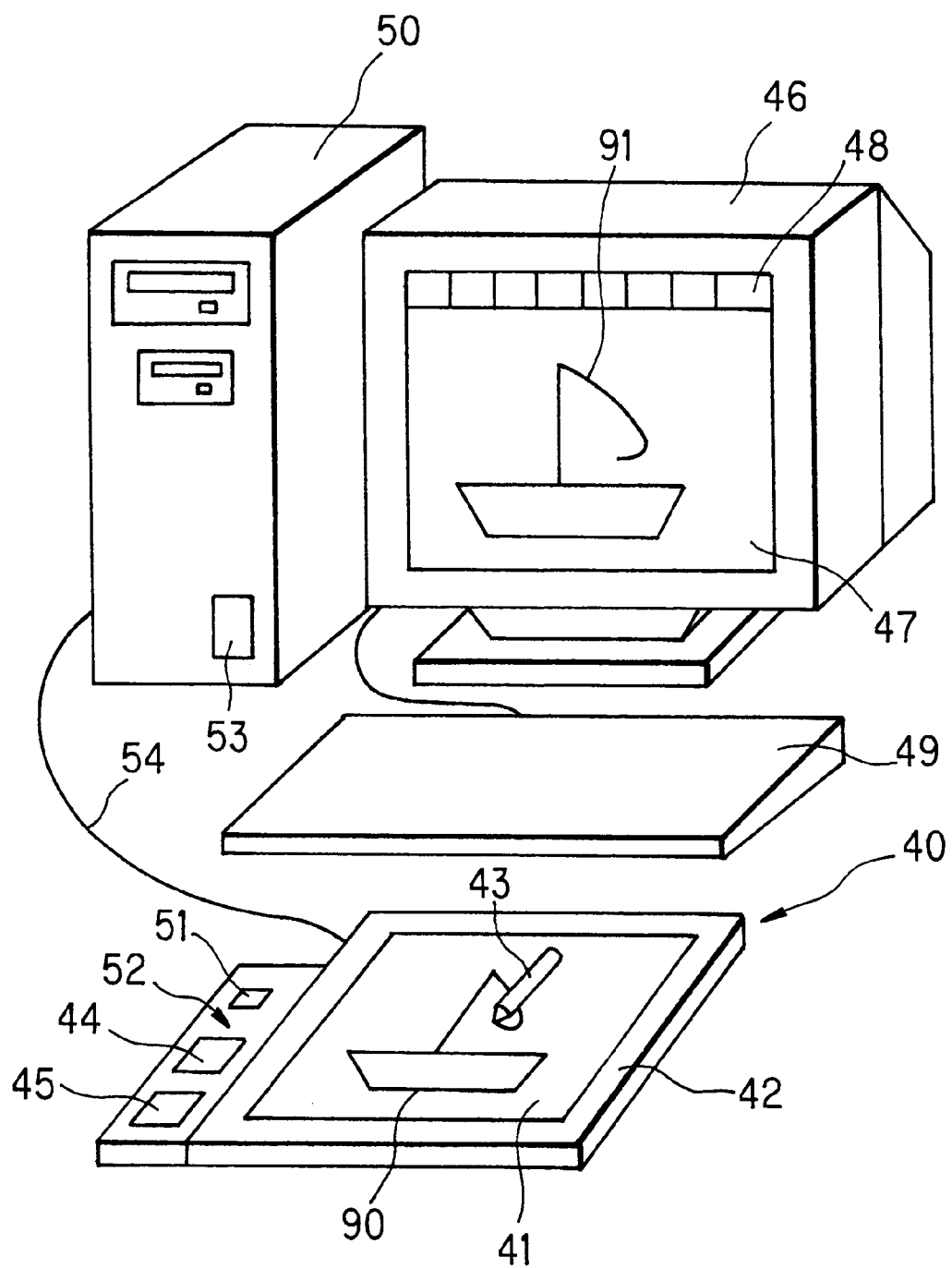
FIG. 5 is a schematic perspective view of the coordinates input device using a liquid crystal sheet according to a second embodiment of the present invention.
Figure 6:
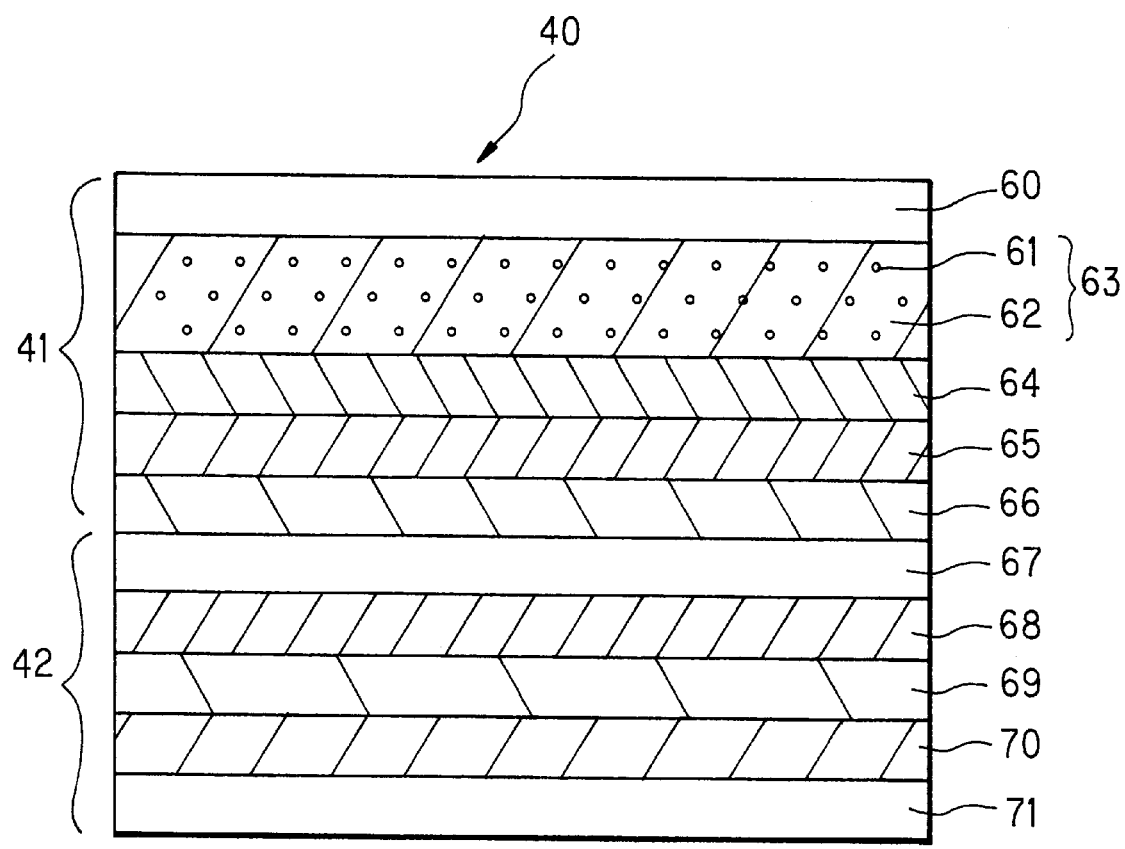
FIG. 6 is a vertical sectional view schematically showing the coordinates input device of FIG. 5.

FIG. 5 is a schematic perspective view of another embodiment of the coordinates input device using the liquid crystal sheet of the present invention. FIG. 6 is a vertical sectional view schematically showing a coordinates input device 40 of FIG. 5. A liquid crystal sheet 41 shown in FIGS. 5 and 6 is also manufactured in a similar manner with that of the above described first embodiment. Namely, the liquid crystal sheet 41 is composed of a conductive layer 65, a transparent high electric resistant layer 64, a liquid crystal-dispersed polymer layer 63 in which liquid crystal droplets 61 are finely dispersed in the polymer matrix 62, and a transparent insulating layer 60, and all of which are sequentially laminated on a base 66.

The liquid crystal sheet 41 manufactured by the above described manner is adhered by an adhesive to a coordinates reading device 42 (herein after called 'a tablet') structured as shown in FIG. 6. The tablet 42 used in this embodiment is the above-described electromagnetic induction type, made of a Y-axis direction coil layer 70, an insulating layer 69, an X-axis direction coil layer 68, and a protecting film layer 67, and all of which are sequentially laminated on a base 71 of an insulating material. In addition, as shown in FIG. 5, a power source box 52 is attached to the tablet 42 for applying electric charge on the liquid crystal sheet 41, and one end of output terminals of the power source box 52 is electrically connected to the conductive layer 65 of the liquid crystal sheet 41. Further, a writing contact electrode 44 disposed on the power source box 52 is electrically connected to the other end of the output terminals of the power source box 52. In addition, an erasing contact electrode 45 disposed on the power source box 52 is electrically connected to the conductive layer 65 of the liquid crystal sheet 41.

Figure 7:
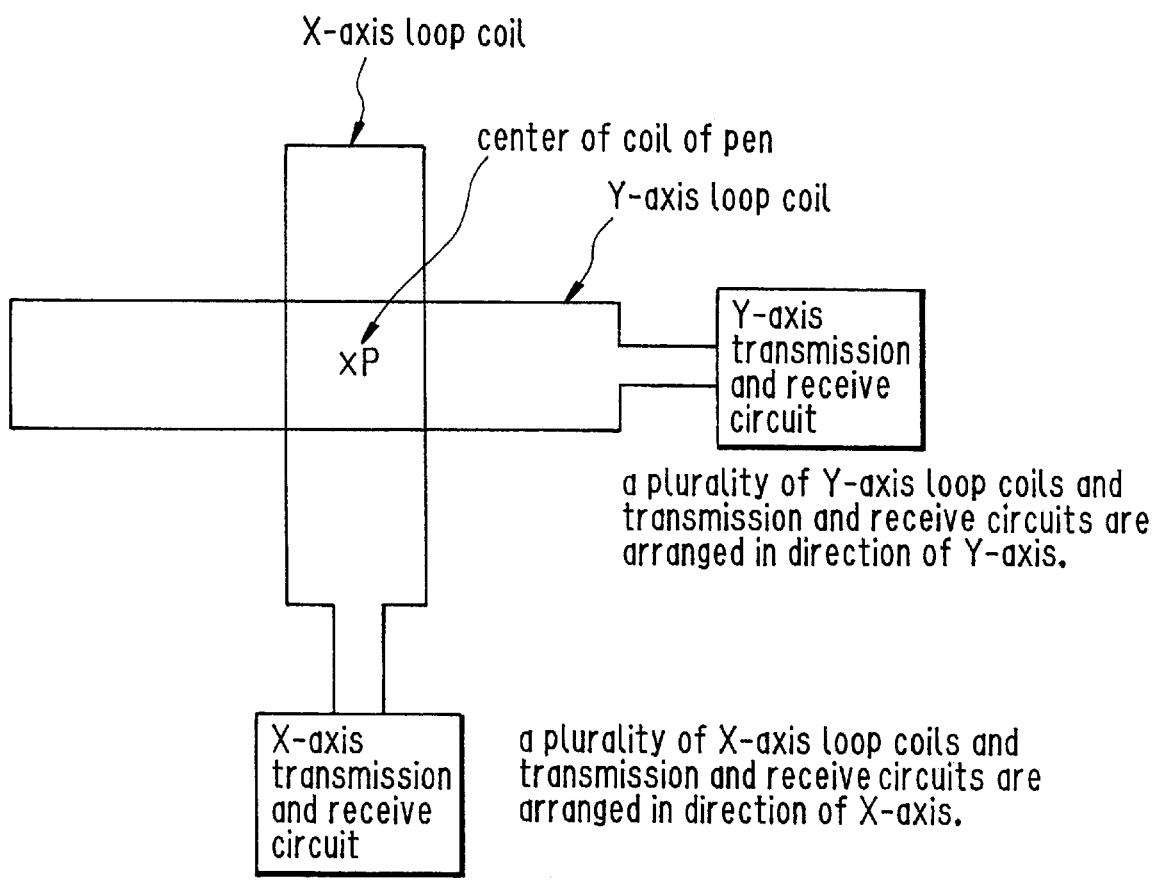
FIG. 7 is a view showing a principle of the coordinating detecting part of FIG. 6.

FIG. 7 shows a principle of the detected coordinates portion of FIG. 6. The X-axis direction coil layer 68 are provided with a plurality of X-axis loop coils (not shown) layered in the direction of the X-axis at a predetermined interval. Similarly, the Y-axis direction coil layer 70 is provided with a plurality of Y-axis loop coils (not shown) layered in the direction of the Y-axis at a predetermined interval. All X-axis loop coils or all Y-axis loop coils are sequentially switched-over to a signal transmission and receiving circuit for the X-axis loop coil or the Y-axis loop coil at a predetermined time interval by a scanning circuit (not shown) operated by an electronic-switch system. The signal transmission and receiving circuit is made of a transmission circuit for giving electromagnetic energy to a pen 43 by using an alternating magnetic flux, and a receiving circuit for receiving a response of the alternating magnetic flux by the electromagnetic energy stored in the pen 43, wherein the transmitting and receiving operations are carried out alternately. Further, the output of the receiving circuit is connected to a calculating circuit (not shown) for calculating the coordinates.

Here, viewing an operation of a specific X-axis loop coil directly under the pen 43 (its inner arrangement will be described herein later) placed on the selected point P on the liquid crystal sheet 41, the X-axis loop coil radiates the alternating magnetic flux for giving the electromagnetic energy to the pen 43, and then the pen 43 receives the alternating magnetic flux by the coil so that the electromagnetic energy is stored in an LC resonance circuit of the pen 43. After the alternating magnetic flux from the X-axis loop coil is shut off, the coil of the pen 43 projects the alternating magnetic flux onto the tablet 42 for a predetermined period of time by the magnetic energy stored in the LC resonance circuit. Ater completing the radiation, the X-axis loop coil is placed in the receiving state, and receives the alternating magnetic flux from the pen 43 to transmit signals to the calculating circuit (not shown) through the receiving circuit. The calculating circuit calculates and compares the signals received from the X-axis loop coil with the signals received from the adjacent X-axis loop coil, so that the coordinates of the X-axis are calculated. Similarly, the same processing is carried out for the Y-axis loop coils, so that the coordinates of the Y-axis are calculated.

Figure 8:
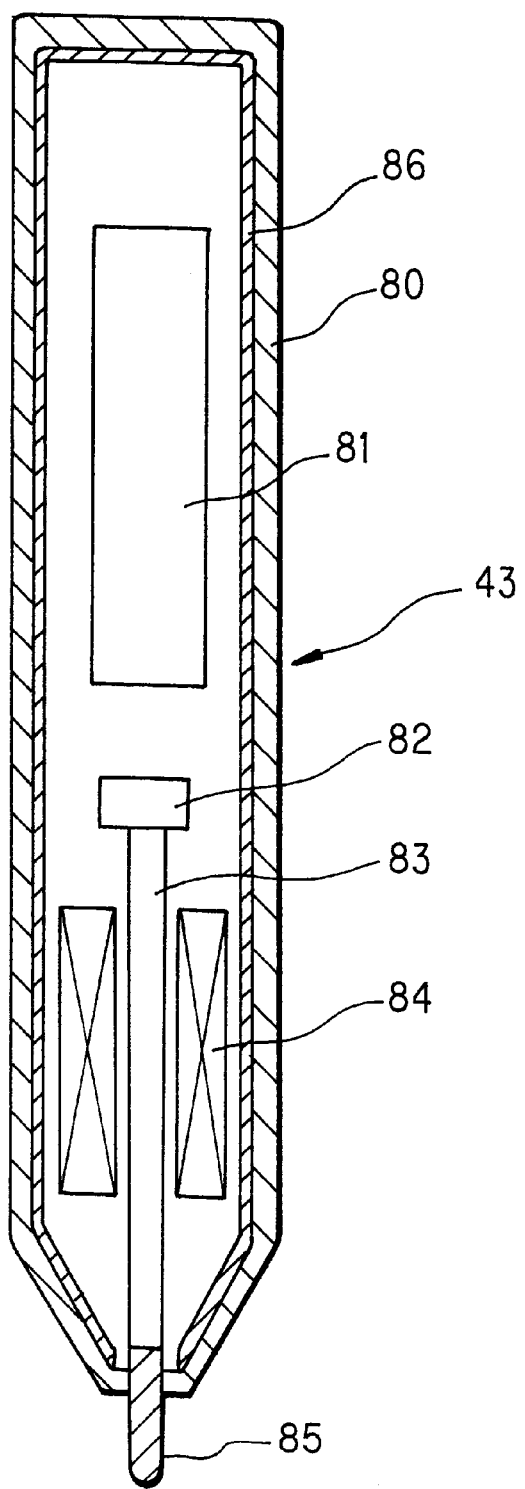
FIG. 8 is a vertical sectional view schematically showing an inner arrangement of a pen used in the second embodiment.

Next, the pen 43 shown in FIG. 5 will be explained. FIG. 8 is a vertical sectional view showing the inner arrangement of the pen for use in the coordinates input device 40. As shown in FIG. 8, the pen 43 comprises an inner barrel 86 of the insulating material and a shaft barrel 80 of the conductive resin covering the inner barrel 86, and the inside of the inner barrel 86 houses therein an LC resonance circuit 81, an writing pressure detecting section 82, a core 83 of the insulating material, a coil section 84 and a writing section 85 of the conductive material provided at the tip portion of the core 83. Although the writing section 85 is electrically brought into contact with the shaft barrel 80, it is not secured by the shaft barrel 80. This is because if it is secured the writing pressure can not be detected by the writing pressure detecting section 82. The LC resonance circuit 81 and the coil section 84 have functions as explained above.

Description will now be made as regards a writing operation by using the pen 43 and the coordinates input device 40 according to the present invention, which comprises the liquid crystal sheet 41 and the tablet 42. After confirming that the coordinates input device 40 is connected to a computer 50 through a communication line 54 and the computer 50 is also connected to a display device 46, a power source switch 51 of the power source box 52 and a power source switch 53 of the computer 50 are turned ON. Although it is not shown, the power supply to the coordinates input device 40 is made externally. In addition, the computer 50 has an installed graphic-software for processing the drawing, erasing or the like by means of various data including the coordinates sent from the coordinates input device 40.

The writing function is selected from a menu of the graphic-software (a menu bar 48 displayed on the screen of a display 47) by means of a keyboard 49 or the coordinates input device 40 connected to the computer 50. Subsequently, while the pen 43 is held with one hand, a writing contact electrode 44 provided on the power source box 52 is touched by a finger of the other hand. Consequently, the power source is electrically connected to the shaft barrel 80 of the pen 43 through the human body, so that voltage for applying an electric charge to the liquid crystal sheet 41 is outputted to the writing section 85 provided on the tip of the pen 43.

With this state, when the pen 43 is brought into contact with the liquid crystal sheet 41 and moved thereon, the electric charge is applied to the written part of the liquid crystal sheet 41, and the liquid crystal droplets 61 in the liquid crystal-dispersed polymer layer 63 are oriented by the electrostatic field. As a result, handwriting appears on the liquid crystal sheet 41 as a liquid crystal representation, so that a drawing pattern 90 is obtained. At the same time, coordinates of a position indicated by the pen 43 are detected by the tablet 42 based on the coordinates detecting principle, and the detected position is converted to coordinates position on the screen of the display 47 of the display device 46. The drawing pattern 91 which is identical with the drawing pattern 90 displayed on the liquid crystal sheet 41 is displayed on the display 47. Accordingly, the drawing pattern 90 which is identical with the drawing pattern 91 displayed on the display 47 remains on the liquid crystal sheet 41. Thus, this allows easier drawing as compared with drawing by relying on one's sense while watching the monitor screen of the display 47 to confirm the handwriting.

To partially erase the drawing patterns 90 and 91 obtained in the above described manner, the erasing function is selected from the menu of the graphic-software. After selecting the erasing function, the pen 43 is held with one hand, an erasing contact electrode 45 provided on the power source box 52 is touched by a finger of the other hand. The erasing contact electrode 45 is electrically connected to the shaft barrel 80 of the pen 43 through the human body. As a result, the equal potential is provided for the writing section 85 of the pen 43 and the conductive layer of the liquid crystal sheet 41. In this state, the drawing pattern 90 on the liquid crystal sheet 41 is traced with the writing section 85 of the pen 43. Since the conductive layer and the writing section 85 of the pen 43 have the electrically same potential, the electrostatic field applied between the surface of the liquid crystal sheet 41 and the conductive layer 65 is neutralized and removed. The liquid crystal droplets 61 in the liquid crystal-dispersed polymer layer 63 are no longer oriented, and only the traced part of the drawing pattern 90 is easily erased. At the same time, not only the drawing pattern 90 displayed on the liquid crystal sheet 41 but also the drawing pattern 91 displayed on the screen of the display 47 are erased. Accordingly, this allows much easier erasing as compared with erasing the drawing pattern 91 by relying on one's sense while watching the monitor screen of the display 47 to confirm the erasing position.

The writing section 85 of the pen 43 may be made of an elastic body which deforms by external force. This allows the contact area between the writing section 85 and the liquid crystal sheet 41 to change corresponding to the change of the writing pressure. That is, when the writing pressure is low, the contact area becomes small, and when the writing pressure is high, the contact area becomes wider, accordingly. The coordinates input device 40 of this embodiment can detect not only coordinates but also the area information. Consequently, it is possible to match the drawing width, or the erasing width on the screen of the display 47 which changes by the change of the writing pressure with the drawing width, or the erasing width of the liquid crystal sheet 41.

According to the coordinates input device using the liquid crystal sheet of the present invention as described in detail, the handwriting appears in the form of the liquid crystal representation on the liquid crystal sheet screen of the coordinates device to obtain the drawing pattern by writing (applying electric charge)on the liquid crystal sheet using the coordinates indicator having a function to apply or remove electric charge on and from the liquid crystal sheet, and the identical drawing pattern is displayed on the monitor screen connected to the coordinates input device. On the other hand, when the drawing pattern on the liquid crystal sheet is traced with the coordinates indicator while the electric charge is removed therefrom, the traced part of the drawing is erased, and similarly, the drawing pattern on the monitor screen is erased corresponding to the traced part on the liquid crystal sheet screen. Accordingly, as compared with the conventional manner, there is no needs to write or erase the drawing pattern by relying on one's sense while watching the monitor screen of the display to confirm the write or erasing position, consequently, writing and erasing can be carried out much easier and accurately.

Further, the writing section of the coordinates indicator is made of the elastic material, and made to correspond to the change of the writing pressure so that the contact area is made smaller when the writing pressure is low and made wider when the contact area is high, thereby the drawing width, or the change of erasing width corresponding to the change of the writing pressure on the monitor screen is matched with the drawing width, or the change of the erasing width of the liquid crystal sheet.

What is claimed is:

1. A coordinates input device comprising:
    a continuous liquid crystal sheet comprising a conductive layer, a transparent high electric resistant layer, a continuous liquid crystal-dispersed polymer layer in which liquid crystal is finely dispersed in a polymer matrix, and a transparent insulating layer, which layers are sequentially laminated;
    a coordinates indicator for applying or removing an electric charge on or from the liquid crystal sheet; and
    a coordinates reading device for continuously detecting coordinates on said liquid crystal sheet indicated by said coordinates indicator.

2. A coordinates input device as claimed in claim 1, wherein said polymer matrix comprises a cross-linked polymer obtained by reacting di- or polyisocyanate with polyvinyl acetal resin.

3. A coordinates input device as claimed in claim 1, wherein said liquid crystal-dispersed polymer layer has a volume resistivity equal to or more than $10^{13}\Omega\cdot cm$ in 20° C. air at a relative humidity of 90%.

4. A coordinates input device as claimed in claim 1, wherein said transparent high electric resistant layer and said insulating layer respectively have a volume resistivity equal to or more than $10^{13}\Omega\cdot cm$ in 20° C. air at a relative humidity of 90%.

5. A coordinates input device as claimed in claim 1, wherein said transparent high electric resistant layer comprises a cross-linked polymer obtained by reacting di- or polyisocyanate with polyvinyl acetal resin.

6. A coordinates input device as claimed in claim 4, wherein said transparent high electric resistant layer comprises a cross-linked polymer obtained by reacting di- or polyisocyanate with polyvinyl acetal resin.

7. A coordinates input device, comprising:
    a continuous liquid crystal sheet comprising a conductive layer, and a continuous liquid crystal-dispersed polymer layer in which liquid crystal is finely dispersed in polymer matrix:
    a coordinates indicator for applying or removing an electric charge on or from the liquid crystal sheet; said coordinates indicator comprising: a power source; a voltage generating unit electrically connected to said power source and for applying an electric charge on said liquid crystal sheet; a changing switch for turning ON/OFF said power source; a shaft barrel housing which houses said power source, said voltage generating unit, and said changing switch; a conductive outer barrel connected to a plus or a minus terminal of said voltage generating unit; and a conductive writing section provided at one end of said shaft barrel and electrically connected to said voltage generating unit through said changing switch;
    a pressure sensitive resistant type coordinates reading device for detecting coordinates on said liquid crystal sheet indicated by said coordinates indicator; the coordinates reading device comprising a Y-axis coordinates resistant sheet, a pressure sensitive sheet, an electrode sheet and an X-axis coordinates resistant sheet, which are laminated; said Y-axis coordinates resistant sheet and axis coordinates resistant sheet being connected to a detecting circuit for detecting coordinates indicated by said coordinates indicator.

8. A coordinates input device using a liquid crystal sheet comprising:
    a continuous liquid crystal sheet comprising a conductive layer, and a continuous liquid crystal-dispersed polymer layer in which liquid crystal is finely dispersed in a polymer matrix;
    a coordinates indicator for applying or removing an electric charge on or from the liquid crystal sheet; said coordinates indicator comprising: an LC resonance circuit; an insulating core body; a coil section disposed around said core body; a conductive writing section disposed at the tip portion of said core body; a writing pressure detecting section, mounted at the rear end of said core body, for detecting a writing pressure of said writing section; an insulating inner barrel housing which houses said LC resonance circuit, said core body, said coil section and said writing pressure detecting section; and a shaft barrel covering said inner barrel and electrically connected to one end of output terminals of an external power source, said shaft barrel slidably supporting said writing section; and an electromagnetic induction type coordinates reading device for detecting coordinates on said liquid crystal sheet indicated by said coordinates indicator, said coordinates reading device comprising a Y-axis direction coil layer, and an X-axis direction coil layer, which are laminated, a plurality of Y-axis loop coils and X-axis loop coils being arranged respectively on said Y-axis direction coil layer and said X-axis direction coil layer; said Y-axis direction coil layer and said X-axis direction coil layer being connected to a signal transmission and receiving circuit for detecting coordinates indicated by said coordinates indicator.

* * * * *